(12) United States Patent
Clarke, Jr. et al.

(10) Patent No.: US 11,149,439 B2
(45) Date of Patent: Oct. 19, 2021

(54) SURFACE MOUNTED CABLE AND TRAY MOLDING

(71) Applicant: Frame & Mullions LLC, Henrico, VA (US)

(72) Inventors: James Thomas Clarke, Jr., Henrico, VA (US); Mark Alexander, Dowagiac, MI (US)

(73) Assignee: Frame & Mullions LLC, Henrico, VA (US)

( * ) Notice: Subject to any disclaimer, the term of this patent is extended or adjusted under 35 U.S.C. 154(b) by 0 days.

(21) Appl. No.: 16/936,974

(22) Filed: Jul. 23, 2020

(65) Prior Publication Data

US 2021/0032872 A1 Feb. 4, 2021

Related U.S. Application Data

(60) Provisional application No. 62/879,687, filed on Jul. 29, 2019.

(51) Int. Cl.
*H02G 3/00* (2006.01)
*E04F 13/074* (2006.01)
*E04F 13/076* (2006.01)
*E04F 13/073* (2006.01)
*H02G 3/12* (2006.01)
*H02G 3/10* (2006.01)

(52) U.S. Cl.
CPC .......... *E04F 13/074* (2013.01); *E04F 13/076* (2013.01); *E04F 13/0733* (2013.01); *E04F 2201/023* (2013.01); *E04F 2201/025* (2013.01); *H02G 3/00* (2013.01); *H02G 3/105* (2013.01); *H02G 3/128* (2013.01)

(58) Field of Classification Search
CPC ................ E04F 13/074; E04F 13/0733; E04F 2201/025; E04F 2201/023; E04F 13/076; H02G 3/0431; H02G 3/105; H02G 3/128; H02G 3/0425; H02G 3/0418; H02G 3/00
See application file for complete search history.

(56) References Cited

U.S. PATENT DOCUMENTS

| | | | | |
|---|---|---|---|---|
| 3,721,762 A | * | 3/1973 | Gooding | H02G 3/105 174/504 |
| 4,391,426 A | * | 7/1983 | Gothberg | H02G 3/0431 248/49 |
| 4,874,322 A | * | 10/1989 | Dola | H02G 3/0431 439/210 |

(Continued)

*Primary Examiner* — Phi D A
(74) *Attorney, Agent, or Firm* — John H. Thomas, P.C.

(57) ABSTRACT

An improved cable molding product that can be easily installed to protect low voltage and line voltage electrical cables in new and existing building construction applications. Its primary benefits are found in decreasing the cost of installation procedures and improving the aesthetics of low voltage electronic system cable and lie voltage cable runs at exterior and interior openings in new and existing buildings. The two-part secure molding system is comprised of a base portion that is mounted for instance to an inside face of rectangular aluminum tubing or any interior wall. Low voltage wiring cable is placed into a rectangular base portion channel. The line voltage wiring is placed into the separate base portion channel. A rectangular cover snaps securely onto and over the base to conceal the cable and wire.

7 Claims, 11 Drawing Sheets

(56) References Cited

U.S. PATENT DOCUMENTS

| | | | | |
|---|---|---|---|---|
| 4,951,716 A * | 8/1990 | Tsunoda | H02G 3/0418 | 138/157 |
| 4,990,722 A * | 2/1991 | Benito Navazo | H02G 3/0418 | 174/101 |
| 5,031,083 A * | 7/1991 | Claesson | H02G 3/0437 | 362/249.06 |
| 5,134,250 A * | 7/1992 | Caveney | H02G 3/0418 | 138/162 |
| 5,235,136 A * | 8/1993 | Santucci | H02G 3/266 | 174/101 |
| 5,274,972 A * | 1/1994 | Hansen | E04F 17/08 | 174/504 |
| 5,836,134 A * | 11/1998 | Couto | E04F 19/026 | 52/718.02 |
| 6,084,180 A * | 7/2000 | DeBartolo, Jr. | H02G 3/0431 | 174/101 |
| 6,191,363 B1 * | 2/2001 | Samuels | H02G 3/0425 | 174/68.3 |
| 6,212,835 B1 * | 4/2001 | Schiedegger | E04F 19/02 | 52/204.53 |
| 6,469,250 B1 * | 10/2002 | Decore | H02G 3/128 | 174/548 |
| D498,211 S * | 11/2004 | Thibault | H02G 3/105 | D13/155 |
| D499,699 S * | 12/2004 | Thibault | D13/155 | |
| 7,385,148 B2 * | 6/2008 | Picard | H02G 3/00 | 174/481 |
| 7,568,323 B2 * | 8/2009 | Shelton | E04C 3/06 | 52/579 |
| 7,877,962 B2 * | 2/2011 | Teffenhart, Jr. | E04C 3/06 | 52/844 |
| 8,341,810 B2 * | 1/2013 | Rayos | F16B 5/0664 | 24/462 |
| 9,385,941 B2 * | 7/2016 | Arai | H04L 49/354 | |
| 9,416,549 B2 * | 8/2016 | Kawalec | H02G 3/0425 | |
| 10,813,455 B2 * | 10/2020 | Ustach | F16B 5/128 | |
| 2015/0360629 A1 * | 12/2015 | Sekino | B60R 16/0215 | 174/68.3 |

* cited by examiner

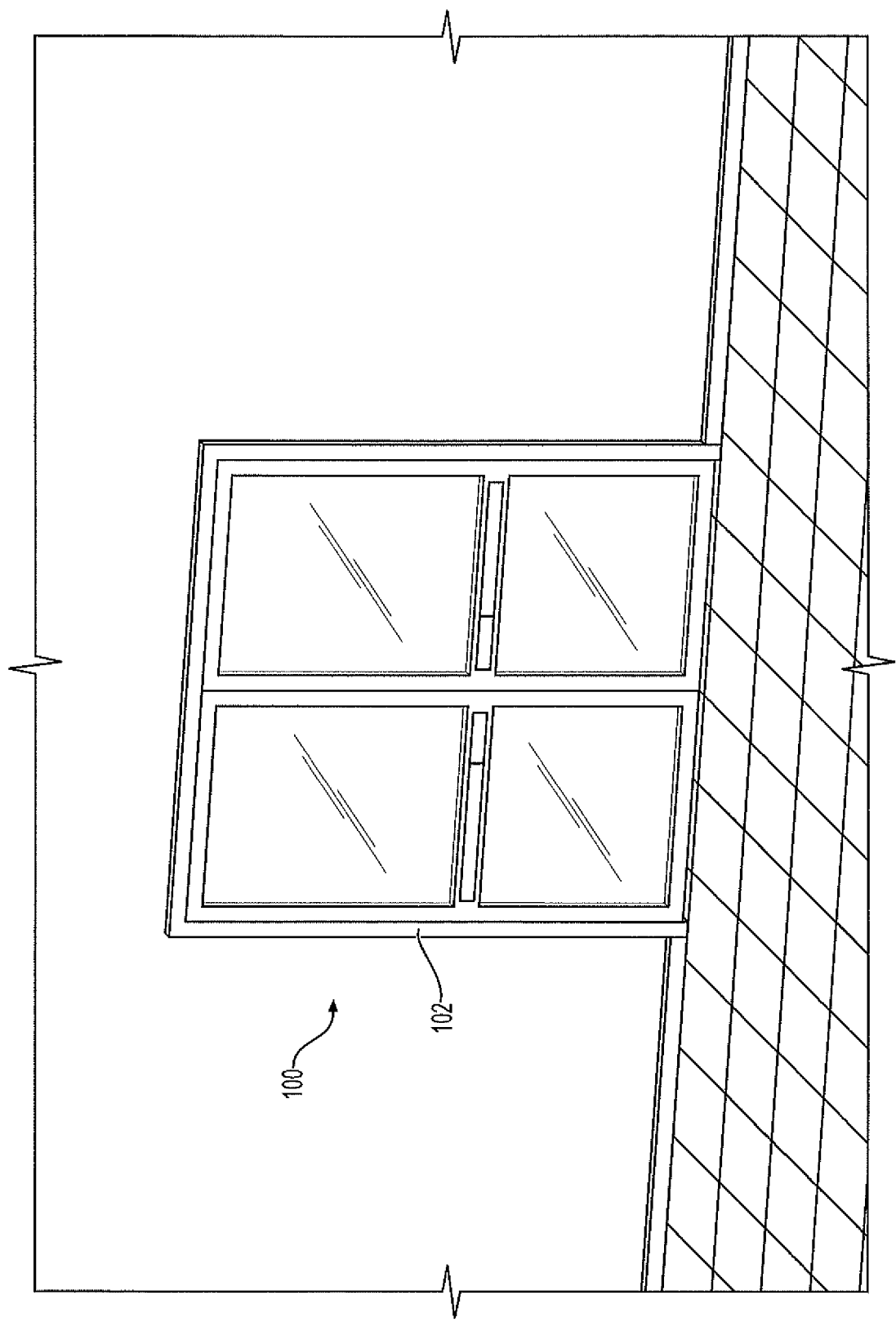

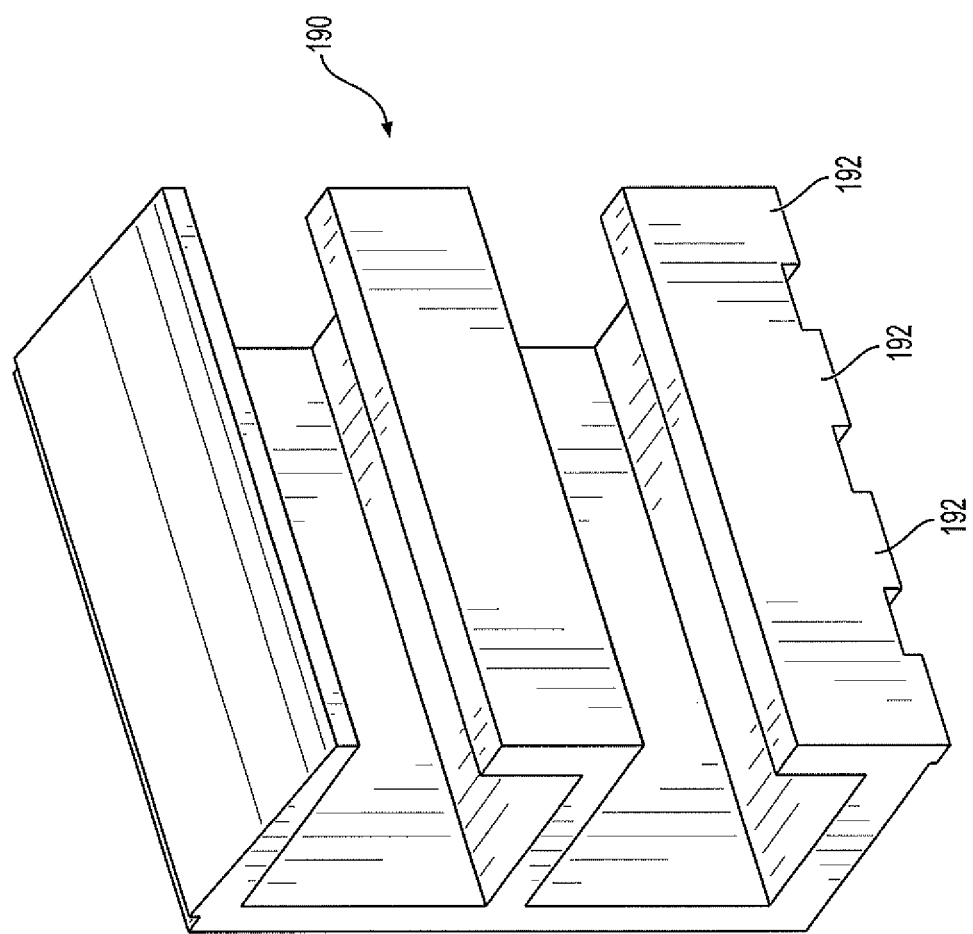

SURFACE MOUNTED CABLE AND TRAY MOLDING

This application claims the benefit of U.S. Provisional Application No. 62/879,687, filed on Jul. 29, 2019, and entitled Low Voltage Surface Mounted Cable Molding, which is incorporated by reference herein in its entirety.

The present invention is an improved cable or tray molding product that can be easily installed to enclose low voltage electrical cables and/or line voltage wiring within a common enclosure in new and existing building construction applications. Its primary benefits are found in decreasing the cost of installation procedures and improving the aesthetics of cable runs at exterior and interior openings in new and existing buildings. The two-part secure molding system is comprised, in one example, of three inch long base channel segments, hereinafter referred to as "base blocks". The base blocks are mounted a minimum of 24" apart for instance to the inside faces of rectangular aluminum tubing, hollow metal or wood frame faces, or onto any interior wall surface. Low voltage wiring cable is placed into the base block in one of the two trays, and line voltage can be placed in a second separate tray in the enclosure. A continuous rectangular cover snaps securely onto the base to conceal and protect the cable and wire within the enclosure.

BACKGROUND

Technological advances and innovations in electronic access control systems and the door and hardware industry have complicated the correlation issues that exist between various trades responsible for providing perimeter security for a building. A common issue is the increase in the project cost as a result of increased labor costs when there is a lack of coordination between these trades. This is especially true on new construction projects with aluminum storefront (SF) and curtain wall (CW) systems at exterior openings.

For safety and security, it is important that electrical wires related to door systems are concealed and protected from inadvertent or intentional damage. Therefore, electrical wires are originally and preferably pulled through metal conduit (piping) installed within building walls. However, to bring the wire to the electrical components on doors in an SF or CW framing system, the wiring is run within the hollow tubes that comprise the frame systems. This has always been a labor-intensive installation procedure in the industry. To meet building codes and wind load requirements, the vertical frame members in the systems have to be continuous from the floor of an opening to the top of the opening. In order to provide the strength and support for the entire frame assembly, in addition the codes may also require that they be internally reinforced with steel stiffeners.

The horizontal frame members are not continuous across an opening. The horizontals are butted to one, or both sides of the vertical members and secured with screws and clips wherever they intersect. To make horizontal wire runs in the tubes, holes have to be drilled through both walls of each vertical member in the wire path as well as the steel stiffeners in the verticals when they are required by code. Once the wire run reaches a vertical member that a door or a pair of doors is hinged on, the wire can be fed down, or up, through the interior of the tube to a wire transfer mechanism in the hinge if access holes have been drilled through the verticals. These transfer mechanisms are most often located at the same height as the lock or exit device mounted on the door. The wire is then connected to wire in the transfer mechanism on the frame side. It then can conduct current through it to wire on the door side of the transfer mechanism where it is connected to the electric lock or exit device on the door.

While existing plastic, steel or aluminum surface mounted cable molding types may be successful for some applications, these known molding products are unsightly and not as adaptable for a number of the practical or aesthetic reasons listed below:

- None of the existing systems have separate trays that allow both low voltage and line voltage wiring in the same enclosure. This feature is especially useful for hardware and equipment that requires both types of voltages, such as automatic operators.
- None are aesthetically or practically designed for use with aluminum storefront or curtain wall systems.
- Some types are plastic and are only used in spaces inside a building.
- Plastic and steel cannot be used as a matching part of an anodized aluminum exterior framing system.
- Plastic and steel molding systems are not designed to be painted with various colors that will match existing anodized, aluminum frame systems or frames requiring matching colors of Kynar Fluorocarbon painted, baked enamel, and similar custom finishes.
- Where low voltage cable molding is mounted on interior walls of new or existing buildings, the mill finish aluminum covers can be impregnated with a primer that can be painted with ordinary house paint to match the wall colors.
- Only the aluminum covers require painting or anodizing, the base blocks are of mill finish aluminum and do not have to be color matched since they are concealed by the cover.
- Plastic components are not durable, are easily damaged and provide little if any security against tampering.
- Some components are steel, with a number of separate connector parts that must be used to make wire runs at butt joints and around internal and external corners that connect surface mounted junction boxes on masonry, concrete or plaster walls. They are labor intensive.
- And after mounting, there is typically no access to cabling without complete deconstruction of the existing, prior art cable molding system.
- Covers for this cable molding can be removed with special tools to access the cable for service or additions at a later date. A person cannot easily pry the covers off without the tools.

SUMMARY

Accordingly, it is an object of the present invention to solve the foregoing challenges to existing cable molding solutions.

In one example, a cable molding assembly comprises a base portion adapted to be fixed to a surface, and a cover portion adapted to be secured to the base portion to secure and conceal cabling that may be mounted therein. The base portion comprises a flat first center portion between a first top arm and a first bottom arm extending outwardly from the top and bottom of the center portion respectively. The first top arm has an upper surface and a lower surface and a proximal end connected to the first center portion and a distal end on the opposite end of the first top arm, and the upper surface of the first top arm slopes downwardly from the proximal end to the distal end, and the upper surface of the top arm further defines an indent that extends along the longitudinal length of the upper surface. The first bottom arm has an L-shape cross-section with a first leg that extends outwardly from the base portion in the same direction as the first top arm and a second leg that extends upwardly and that defines a channel between the bottom first and second legs and the base portion, and wherein the first bottom arm first leg has a distal end connected to the base portion and has a first protuberance that extends downwardly from and along the longitudinal length of the first bottom arm. The cover portion has a C-shape cross section comprising a second center portion and a second top arm and second bottom arm with the second top arm and second bottom arm extending in the same direction substantially perpendicular from the second center portion; wherein the second top arm defines a lip protuberance downwardly from the second top arm in the direction of the second bottom arm and extending longitudinally along the length of the cable molding; and wherein the second bottom arm has a longitudinal notch that extends along the longitudinal length of the cable molding on an inside top surface of the second bottom arm. The cover portion is sized and adapted to be positioned over the base portion so that the first protuberance on the base bottom arm is received in the notch on the cover of the second bottom arm, and the lip protuberance on the cover second top arm is received in the first indent on the upper surface of the base portion top arm.

The indent may be formed at the proximal end of the upper surface of the first top arm of the base portion. The notch may be formed at the proximal end of the top of the second bottom arm of the cover portion. The base portion may comprise a second L-shape arm that extends outwardly and upwardly from the base portion in the same direction as the first top and first bottom arms of the base portion to thereby form a second channel in the molding. The cover portion may further comprise an additional arm extending outwardly therefrom in the same direction as the second top arm and second bottom arm to thereby form an additional channel in the cable molding. The protuberance may extend along the entire longitudinal length of the cable molding cover and base portion. The lip may extend along the entire longitudinal length of the cable molding cover and base portion. The base portion may comprise a plurality of base blocks, and the length of the base blocks may be 3 inches. Any shorter block may not provide sufficient holding power to retain the cover and a longer one will make the cover more difficult to remove for service.

BRIEF DESCRIPTION OF THE DRAWINGS

FIG. 6A is a perspective view of one example of a cable molding assembly as mounted around a door.

FIGS. 8A-C are assembled views and FIGS. 8D-F are exploded views.

FIG. 9 is a perspective view of a base portion of a cable molding with an alternative structure of the protuberance on the bottom of the base portion.

DETAILED DESCRIPTION

Figure 1:
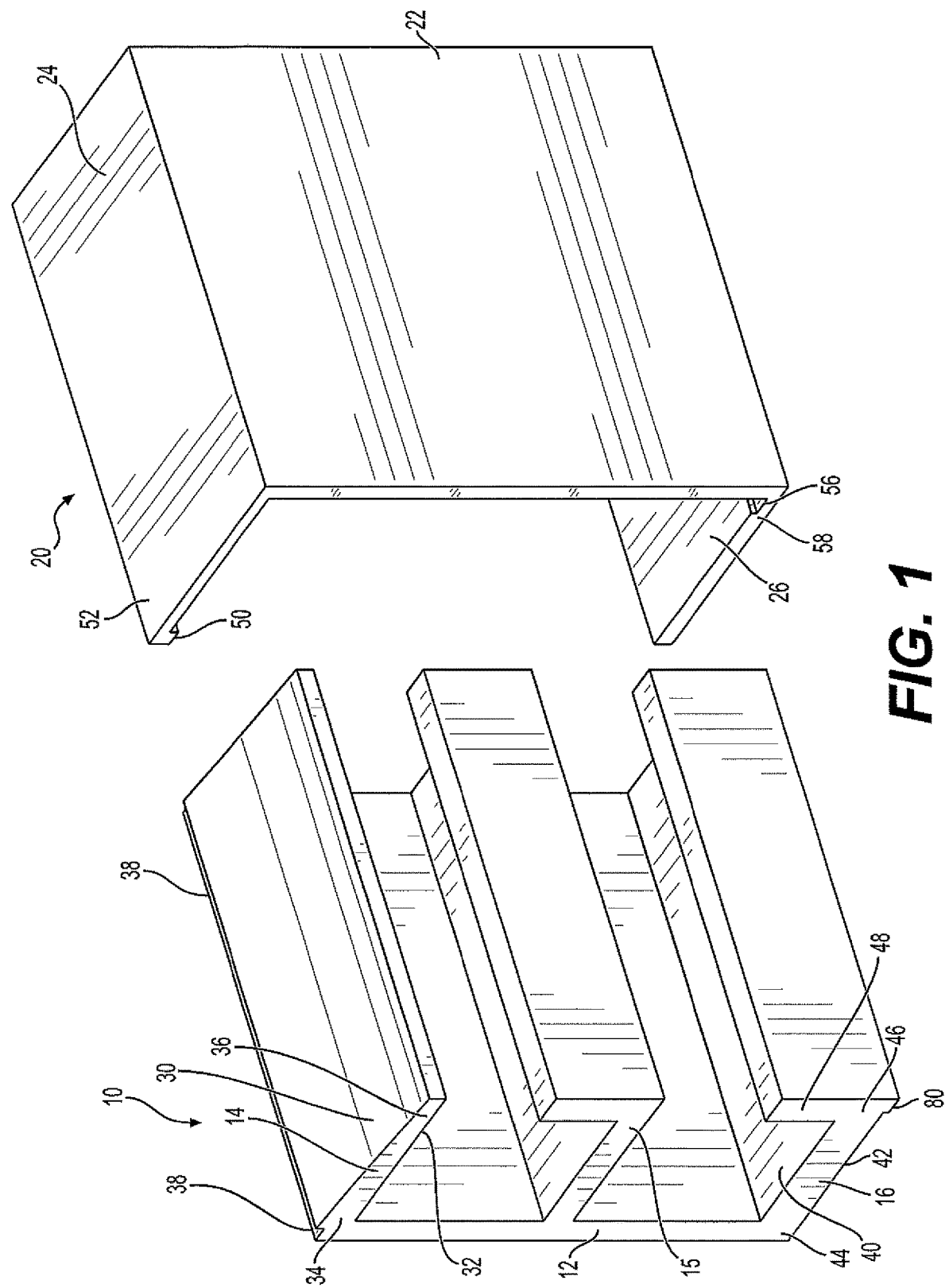
FIG. 1 is a perspective, exploded view of a cable molding assembly as described herein.
Figure 2:
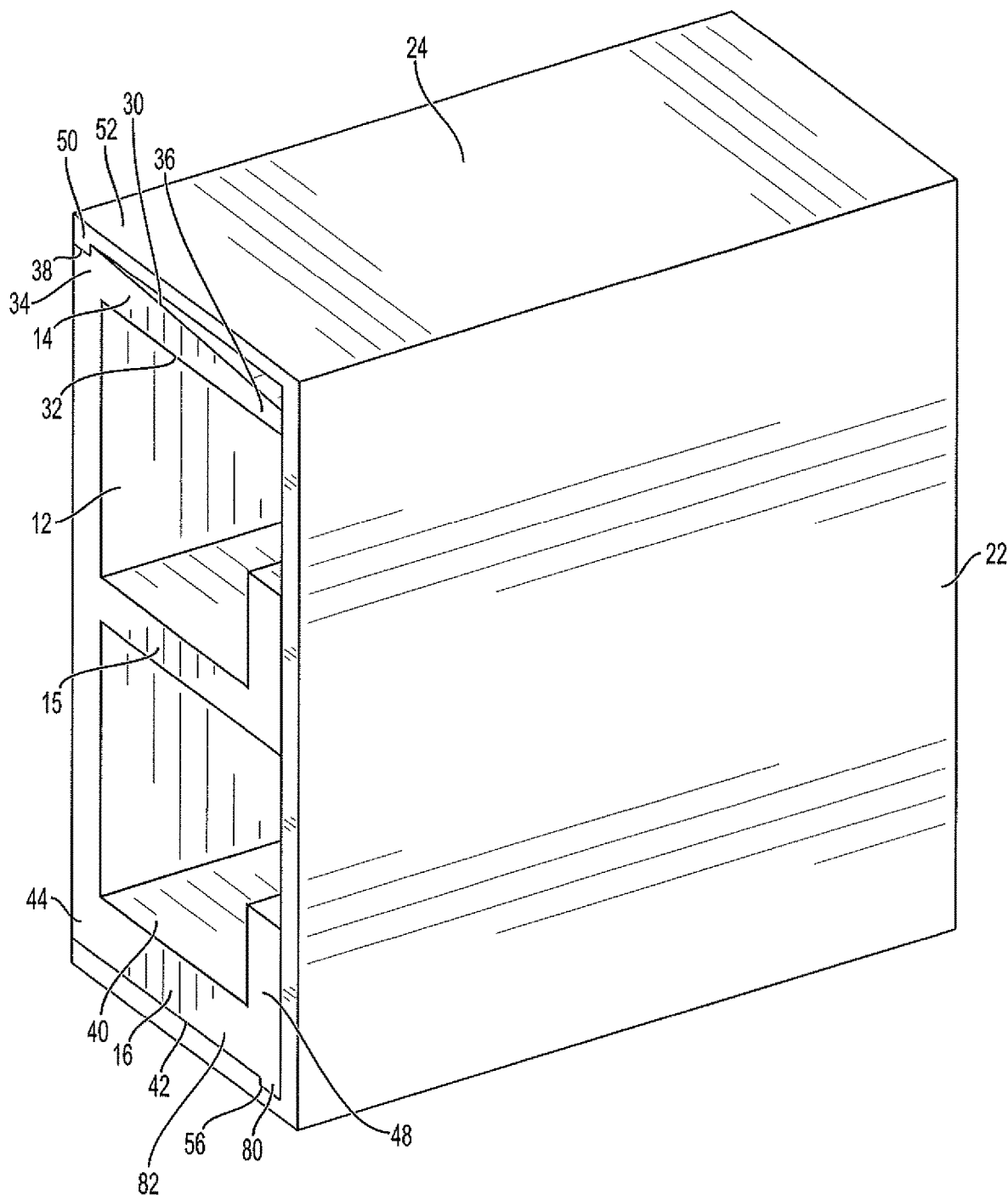
FIG. 2 is a perspective view of a cable molding assembly as described herein.
Figure 3:
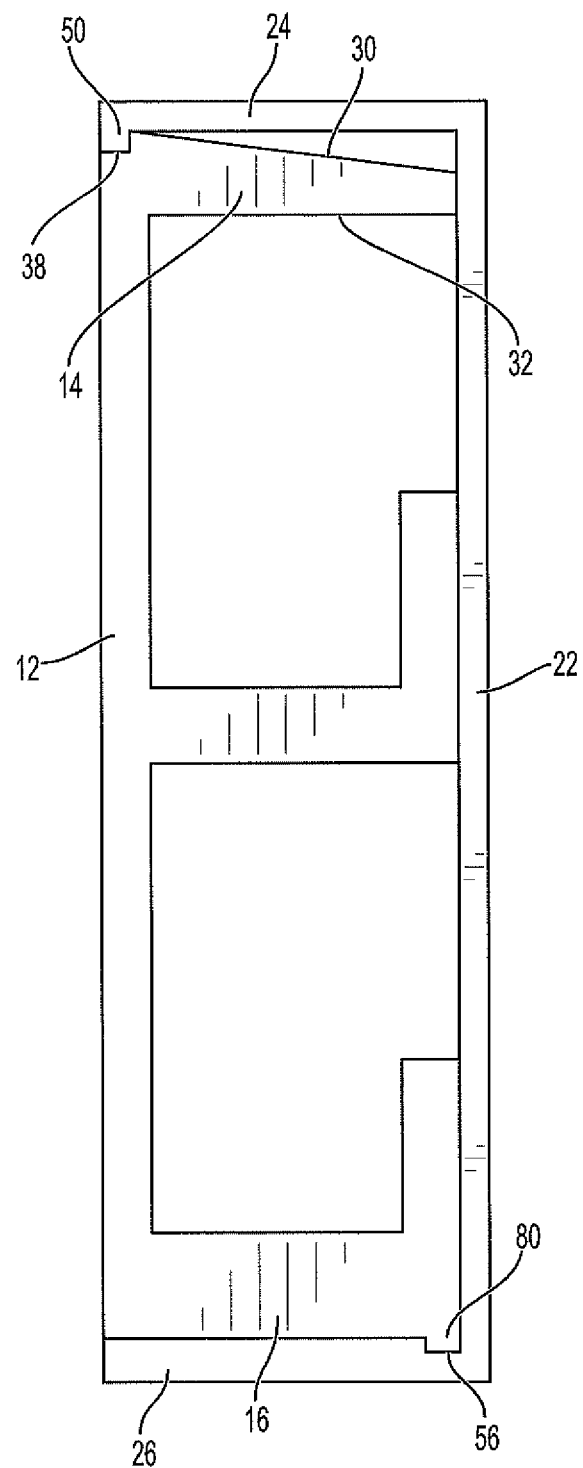
FIG. 3 is a side view of a cable molding assembly as described herein.

The cable molding described herein includes two parts as illustrated in FIGS. 1-5. In the figures, only a short segment is shown. Of course the cable molding can be as long or as short as required for an installation. First, there is a base portion 10 that is adapted to be fixed onto a wall or building surface. Once installed onto a wall or surface, the base portion is then ready to receive electrical cabling. And second, a cover portion 20 snaps securely in place over the base 10 to hold and protect the cabling therein.

The base portion 10 of the molding has a square G-shaped tray in cross-section. First top arms 14 and bottom arms 16 connect at their proximal ends to a substantially straight and flat first center portion 12. This center portion 12 will be fixed onto a wall or building surface by screws or adhesive or other fastener. This center portion 12 may have holes predrilled or formed therein for ready installation. The base portion 10 may be continuous along a straight length of an installation—e.g. for seven feet on a seven foot door installation. Alternatively, the base portion may be sectioned into smaller lengths and in one example spaced a minimum of 24" apart along a length. The base portion may have segment lengths of 3 inches. Any shorter block may not provide sufficient holding power to retain the cover and a longer block will make the cover more difficult to remove for service.

It needs to be noted that both the base portion and cover portion are described as having top and bottom arms. This orientation is arbitrary in that it could also be right and left or some other directional name. They are simply on opposite ends of the base portion and cover portion respectively.

The first top arm 14 of the base portion defines an upper surface 30 and lower surface 32. The lower surface 32 as shown in the figures is substantially perpendicular to the flat center portion 12. Optionally, the first top arm 14 may have a downward tilted or curved lower surface 32. The upper face 30 of the first top arm 14 slopes or curves downwardly from its proximal end 34 where the top arm meets the center portion 12 toward the distal end 36. When the lower surface 32 of the first top arm 14 is substantially perpendicular to the center portion 12, then the top arm has a wedge shape as defined by its upper and lower surfaces 30 and 32. The upper surface 32 of the top arm 14, at its proximal end 34 at the center portion 12, also defines a first indent 38. This first indent 38 is a shallow channel that runs in segments or alternatively along the entire longitudinal length of the base portion 10 of the molding. This first indent 38 is optionally at the proximal end 34 of the upper surface 30 of the top arm 14. However, an indent may alternatively be provided along the longitudinal length of the upper surface of a top arm anywhere on the distance between the proximal end of that top arm to its distal end. This indent 38 is shaped and engineered to receive a longitudinal lip 50 from the cover portion of the molding.

The first bottom arm 16 of the base portion 10 of the molding has an L-shape cross-section connected on its proximal end 44 to substantially the bottom of the center portion 12. The first leg 40 of the L-shape bottom arm 16 extends out substantially perpendicularly from the center portion 12 and in the same direction as the top arm 14. The bottom surface 42 of the first leg 40 of the first bottom arm 16 is shown with a longitudinal protuberance 80 at the bottom of the distal end 46 of the first leg. The second leg 48 of the L-shape of the first bottom arm 16 then extends upwardly in a direction toward the top arm 14 to form a three-sided channel together with the center portion 12. This channel is sized to receive and guide electric cables that are to be mounted in the molding. The L-shape of this first bottom arm 16 can be squarish or may have some curved portions thereof. If there is any curvature, then it must not be in the direction toward the top arm.

The cover portion 20 of the cable molding has a C-shape in cross-section and has a second center portion 22 and second top 24 and bottom 26 arms. The second center portion 22 is generally straight and flat in cross-section. The second top 24 and bottom 26 arms are, in one example, generally straight and extend substantially perpendicularly out from the center portion 22 and in the same direction. The second top arm 24 also defines a lip 50 at its distal end 52 that protrudes downwardly toward the bottom arm 26. The downward length of lip 50 is about 1/16 to 1/4 of an inch. This lip 50 may run the entire longitudinal length of the cable molding. or alternatively, it may only extend downwardly in shorter lengths or even just tabs along the longitudinal length.

The second bottom arm 26 of the cover 20 has a longitudinal second notch 56, in one example, where the proximal end 58 of the bottom arm 26 meets the center portion 22. This notch 56 may alternatively be provided at some alternative position on the inside surface of the bottom arm. This notch will run substantially the entire length of the cable molding, or alternatively it may run in smaller segments along the longitudinal length.

Figure 4:
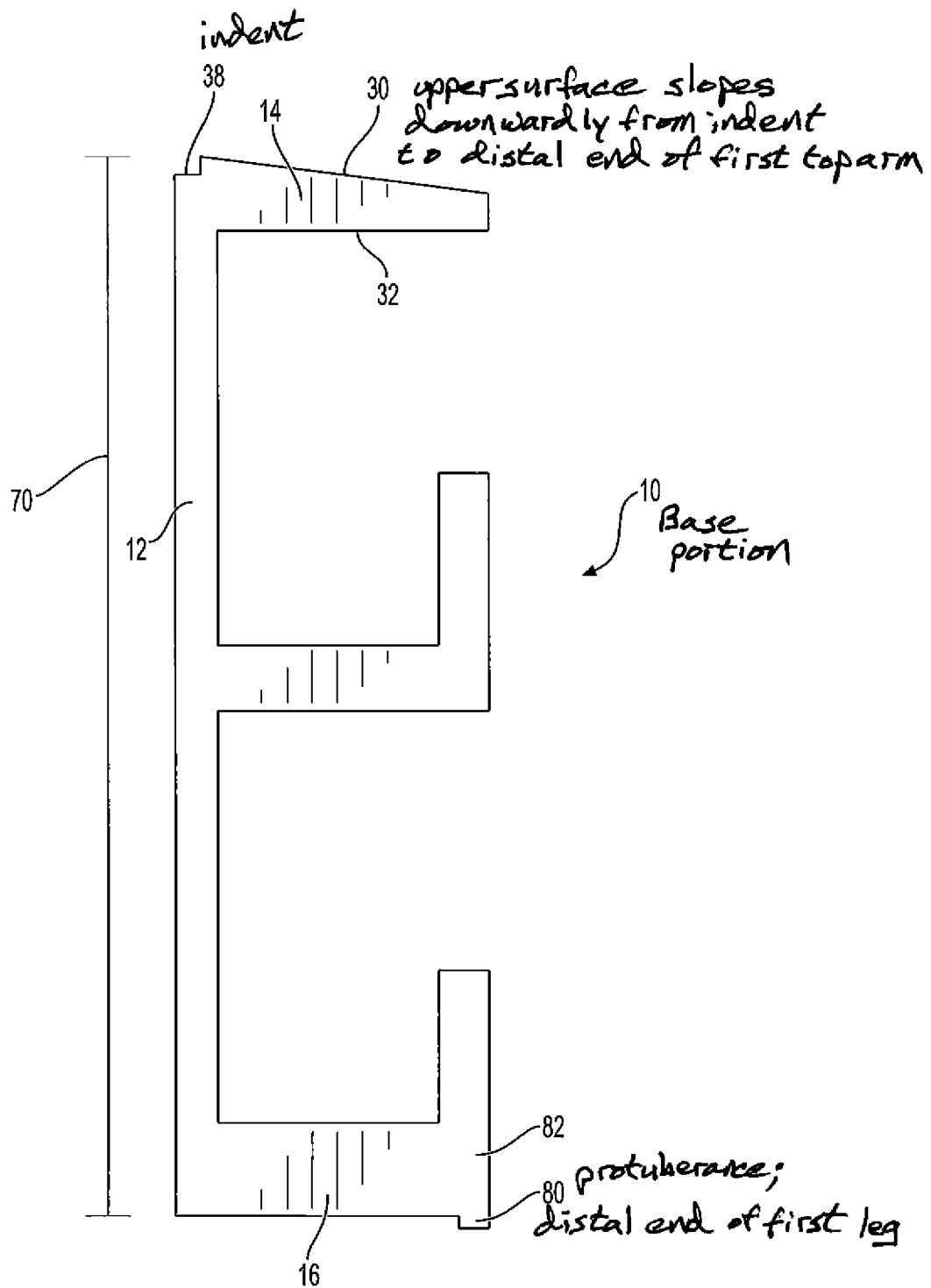
FIG. 4 is a side view of a base portion of a cable molding assembly as described herein.
Figure 5:
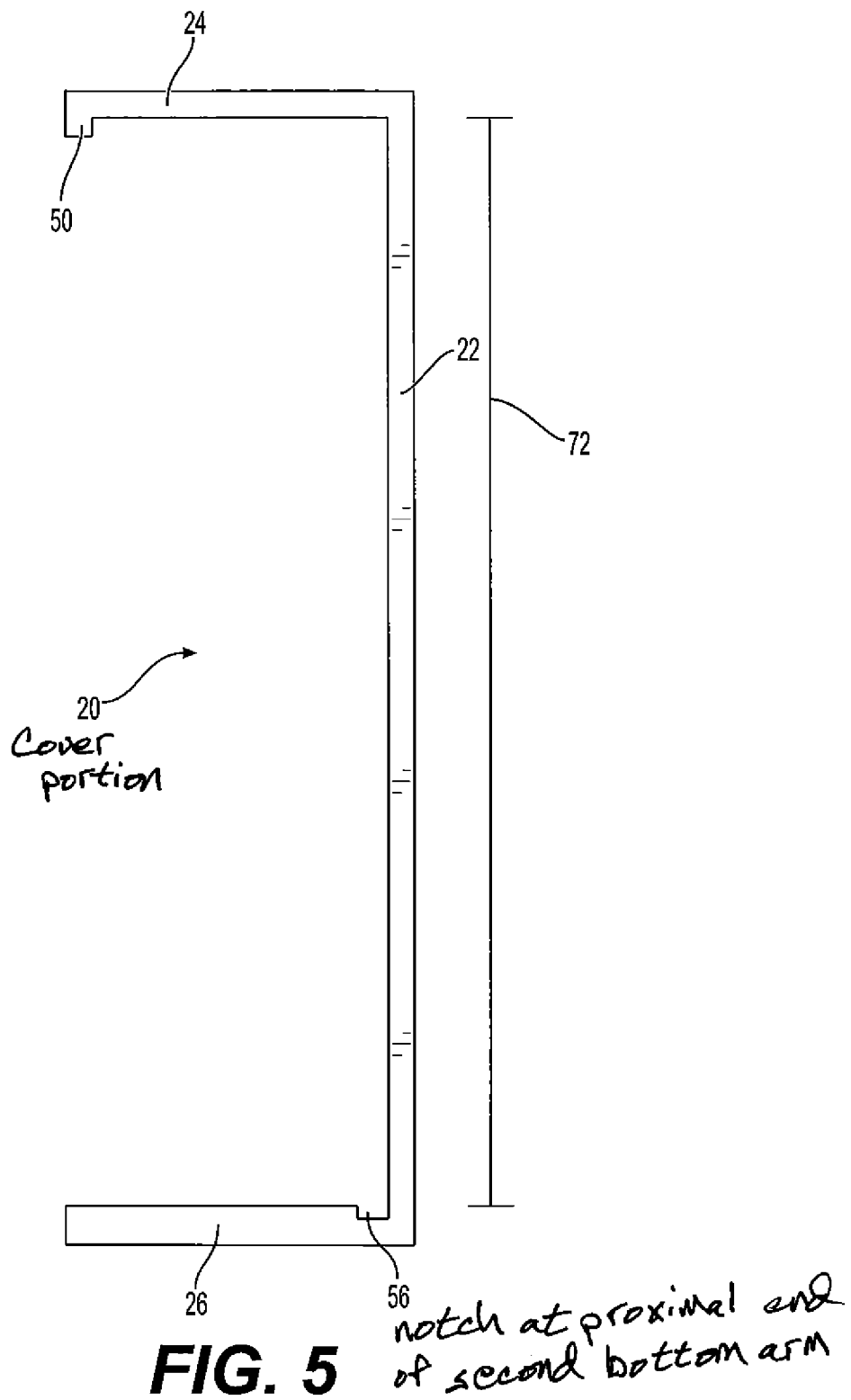
FIG. 5 is a side view of a cover portion of a cable molding assembly as described herein.

The height and width of the base and cover portions of the cable molding are significant. Referring now to FIGS. 4 and 5, primarily, the outside dimension (OD) 70 of the base 10 height and width are significant as are the inside dimension (ID) 72 of the cover portion 20. The OD 70 and ID 72 are substantially the same, within about 1/128 to 1/64 of an inch. When assembled, the protuberance 80 on the distal end 82 of the bottom base arm 16 will fit into the groove 56 in the proximal end 58 of the bottom cover arm 26. The protuberance 80 extends downwardly a small distance, including about the same distance as the depth or less or possibly a little more or less than 1/64 to 1/32 of an inch. The protuberance may extend the entire longitudinal length of the cable molding, or alternatively, it may extend down in shorter sections or even just short tabs along the longitudinal length of the cable molding. Similarly, the top cover arm 24 distal lip 50 will fit into the proximal top arm 14 of the base portion 10 outside channel 38. The wedge shape of the outside surface 30 of the base top arm 14 allows the cover arms are free to slide over the base and snap into channel 38. The dimensions are intentionally very tight. A slight flex in the cover or in the base arms allows for the cover to snap in place over the base and secure electrical cables inside the molding.

The base and cover portions of the cable molding may be formed of the same or different materials. In one example, the material may be a metal like aluminum or steel or some other alloy of metal. Alternatively, the base and cover may be formed of a polymer. The base and cover may be different materials. It is believed that a rigid material is a good material, because the cover may be snapped in place so that it may not be casually removed by anyone not authorized to do so. If a particular application does not require high security, a polymer material might be chosen for its favorable cost. In one example of an aluminum material, the wall thicknesses can be from 0.02 to 0.1 inches, or in one example, about 0.05 inches. The thickness will depend on the application and on the desired rigidity of the cable molding. Given the tight tolerance needed for the cover to snap into place, the material cannot be so thick and rigid that it will not be able to snap in place.

The base portion of the molding was described herein with a single channel to hold cabling. As shown for example in FIGS. 1-5, there may be additional L-shape arms, for instance arm 15, that extend outwardly and upwardly from the base portion that would create additional channels in the molding. These additional arms will have the same or similar shape as the bottom L-shape arm described. The additional arms would not extend out farther that the bottom arm, because this could hinder or prevent closure of the molding. In one example, the extra L-shape arm 15 would extend out from the middle of the base center portion to thereby create two substantially equal channels to hold a cable.

Figure 8A:
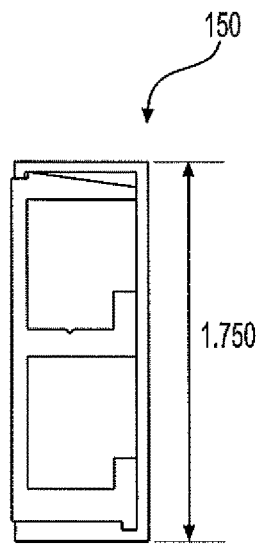
FIGS. 8A-F are side views of alternative cable molding assemblies.
Figure 8B:
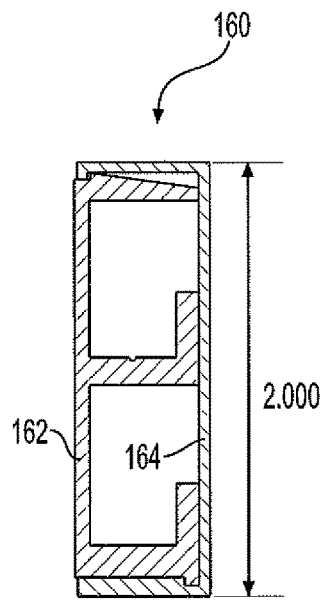
Figure 8C:
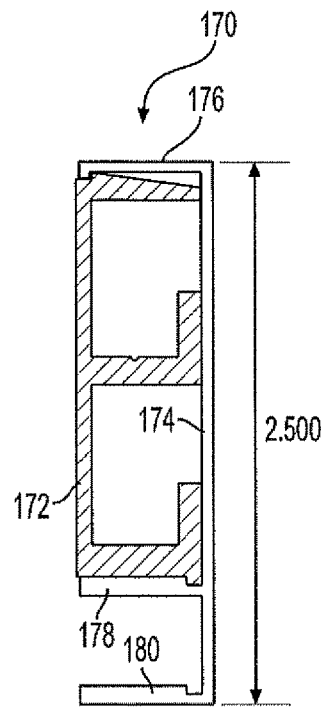
Figure 8D:
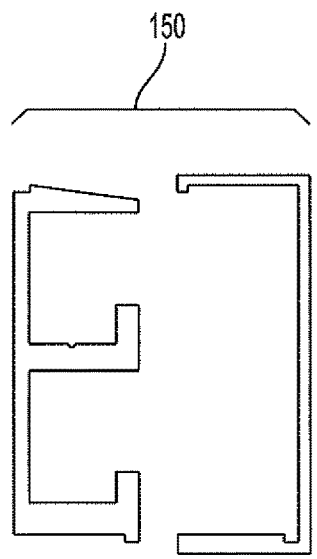
Figure 8E:
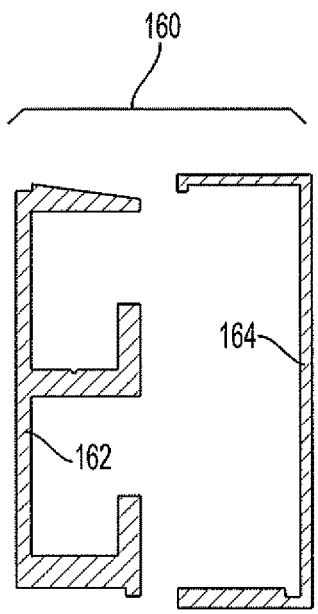
Figure 8F:
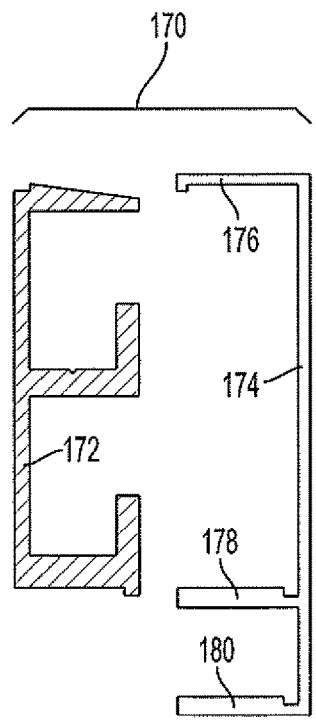

FIGS. 8A-F illustrate alternative embodiments of a cable molding as described herein. The molding is aesthetically engineered so that it is the same or similar width as the front face of a door mullion or crossbar so that it will blend into the doorway or other location. The molding may therefore be the same width as such mullion tube facing. For instance, the molding 150 may be 1.75 inches, or the molding 160 may be 2 inches in height as shown in FIGS. 8A, B, D and E. Moldings 150 and 160 are proportionally the same as described earlier herein. It is expected, without limitation, that these will be useful sizes with respect to many door frame applications. However, also shown in FIGS. 8C and F is a 2.5 inch molding 170. This molding 170 includes a base 172 that is dimensionally the same as base 162 in the 2 inch molding 160. The cover piece 174 is different. The cover piece includes a top arm 176 and middle arm 178 that are exactly proportionally the same as for cover portion 164 on the 2 inch molding 160. Cover portion 170, however, also includes an additional arm 180 that extends downwardly the extra length and backwardly the same depth as arm 178. The additional length covered by the extra arm 180 could be used when covering a wider mullion or door frame member and provide a better aesthetic appearance once installed. Of course, the dimensions shown in FIGS. 8A-F are simply examples and other sizes are possible as needed. Also, the extra arm 180 could additionally or alternatively be positioned on the top and above the top arm 176 to span another appropriate distance. In such wider applications like molding 170, the base portion 172 could be lengthened to match the cover length and alternatively also provide another cable holding track.

Some examples of where locations of electrical hardware and security system components may be found at an opening, and consequently where the molding described herein may be used to provide wire pathways to the hardware located in these places, are listed below:

On masonry walls above the frame header or on an adjacent wall near the opening on either the secured side or unsecured side of the doors
(Passive Infrared Detectors, audible door prop and unauthorized egress alarms, card readers, auto operator actuators, emergency release buttons for magnetic locks, and 120 VAC magnetic hold open devices connected to fire alarm systems)

On the faces or undersides of steel or aluminum frame headers and on the faces of jambs on the inside or outside of the openings (Electric mullion head blocks, passive infrared detectors, card readers, auto operators and their actuators, surface or concealed electronic fire and smoke closers, electric strikes for single doors, and door contacts for intrusion detection and door position switches)

On door edges and on their inside and outside faces
(Electric panic devices, electric locks, electric hinges, electric strikes on inactive leaves of pairs)

On removable mullions for pairs of doors
(Electric strikes)

On free standing pedestals for automatic operator actuators at handicapped entry points outside the buildings.
(Hardwired auto operator actuators)

Above the suspended ceiling on a wall
(Power supplies for electric locks and controllers for card access systems and junction boxes for wire connections)

On any interior wall or ceiling of new and existing buildings.

The molding in one example has a low profile at 2" wide×⅝" high. Each run/length of the molding will accommodate four 22 gage, 12 conductor cables, The molding covers can be manufactured including, but not limited to, in the following finish types:

Dark Bronze, Clear or any other standard, anodized aluminum color.

Kynar Fluorocarbon painted, baked enamel custom finishes.

Mill finished covers are available that are impregnated with an aluminum primer for field painting with standard house paint to match any wall color or wood trim in interior areas where there are dry wall or plaster ceilings.

Some reasons why the molding is easy to install and use include the following:

There are only two components—a base and a snap cover. No other connection pieces are required since all joints can be butted or mitered, similar to what is done when installing wood molding in a room. No special components are required for 90 degree butt joints or 45 degree corner joints or for inside or outside corners of a wall.

The molding can be cut in the field with a chop saw. During installation, the base is first cut into 3" sections called base blocks. Each block may be drilled with four countersunk holes, one in each corner of the block, and attached to the mounting surfaces at approximately 24" apart. The base is not a not continuous piece like the cover.

Once they are positioned, it is secured to the mounting surfaces with fasteners appropriate for a particular type of wall (e.g., sheet rock, wood or steel studs, masonry or plaster).

The base is thick enough to allow the screws to be countersunk flush with the interior wall of the base so as to not interfere with the cable runs.

Each base may have two trays that will accommodate four 22 gage, twelve conductor cables to service two pair of doors in a storefront or curtain wall or other system. That means 48 individual wires can be placed in the trays.

When line voltage and low voltage current is required for operation of equipment like automatic operators according to electrical code, the two wire types can be installed in separate trays in the one enclosure. Separate enclosures would not be necessary.

The cable molding is normally installed on the inside faces of the frame members within a building for more security and resistance to vandalism. These are normally secure spaces that are not exposed to the weather.

Once the molding is installed the molding can be removed for access with special tools to pry the covers away from the base blocks to allow access to the concealed cable and wiring.

Optional access panels can be made if desired. Usually about three inches long, or alternatively one to six inches long. They are just shorter sections of the vertical snap cover 132 and 136 that are cut in the field with a chop saw. The cuts are generally made in the vertical covers of the cable molding on the hinge jamb or the door jamb sides of the frame assembly, usually from 4" to 6" down from the underside of the header above the door opening. The bases 130 and 134 are not cut through at this point, only the covers 132 and 136. However, the base blocks should never be installed so as to cover an access hole. Though the cover snaps firmly onto the base blocks, it can slide up and down on the fixed base blocks. When the access cover panels 131 and 135 are removed, with a custom tool, the top portion of cover 132 and 136 can be slid down to expose the access holes 122 and 124. This arrangement gives the installers and maintenance people the access point they need to pull additional wire through the system at a later date, or if there is a need to inspect the integrity of an existing wire run. When finished, the covers 131 and 135 can be slide back up into place over access holes 122 and 124. Then the access panel 131 and 135 can be snapped back onto the base.

As mentioned above, is not necessary for the base to be continuous for the full height of the jambs. It can be installed in sections to save materials costs. For example, generally it should be sufficient for a 7'-0" tall frame to employ about four 3" base block sections spaced about 24" apart on the frame face to secure the continuous cover. This spacing will maintain the appearance that the door frame and the cable molding assembly are one and the same. Alternatively, the base sections may be shorter or longer segments, for instance 3" sections spaced about 12" apart. The panel seams will be nearly imperceptible to the untrained eye.

Though the base cover and the removable panel cover easily snap onto the base. It takes a custom tool and unique method to remove them. The cover cannot be easily removed without the tool. The tool may also facilitate removal of a panel cover to use the segmented base sections as described above.

Figure 6B:
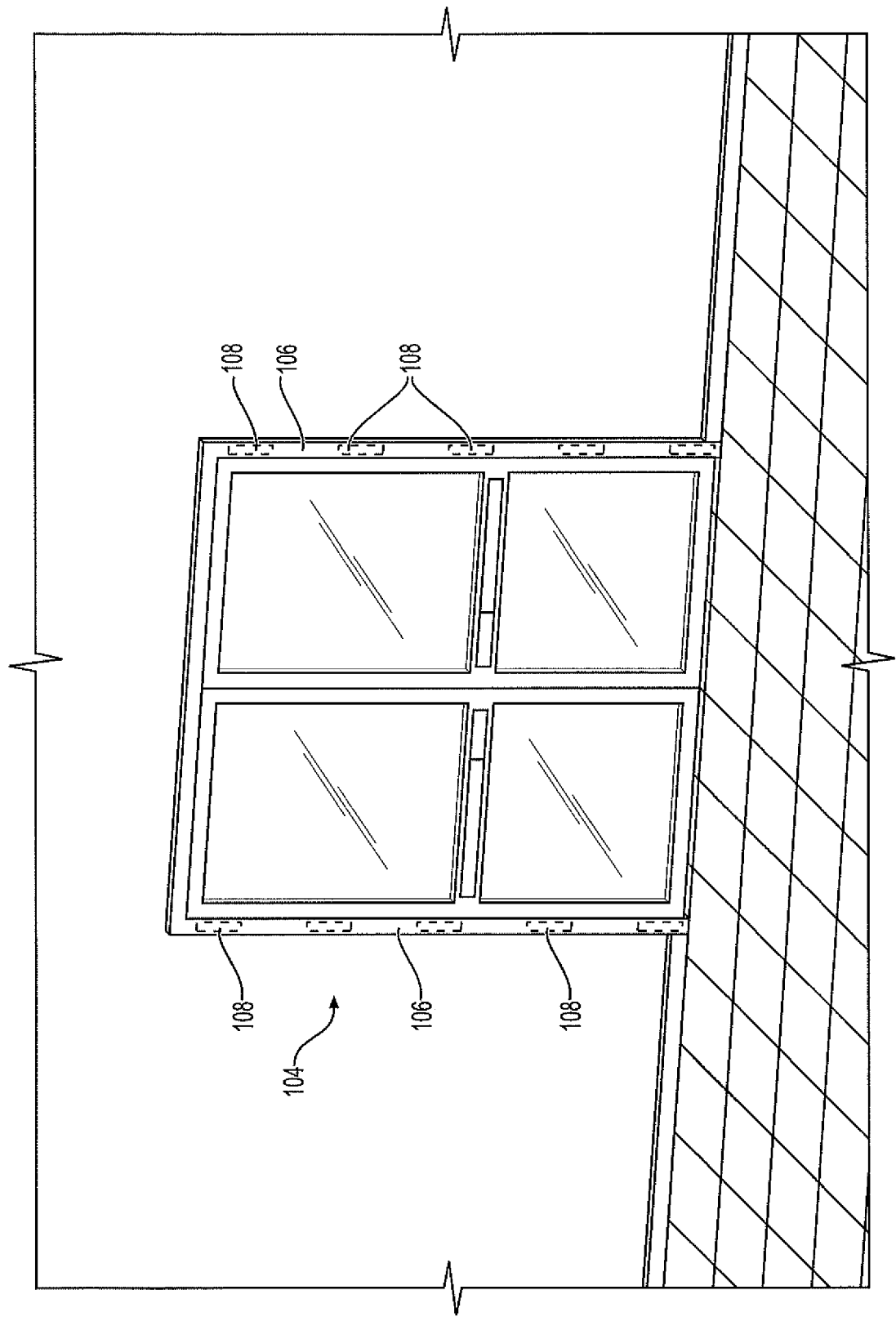
FIG. 6B is a perspective view of another example of a cable molding assembly as mounted around a door.
Figure 7:
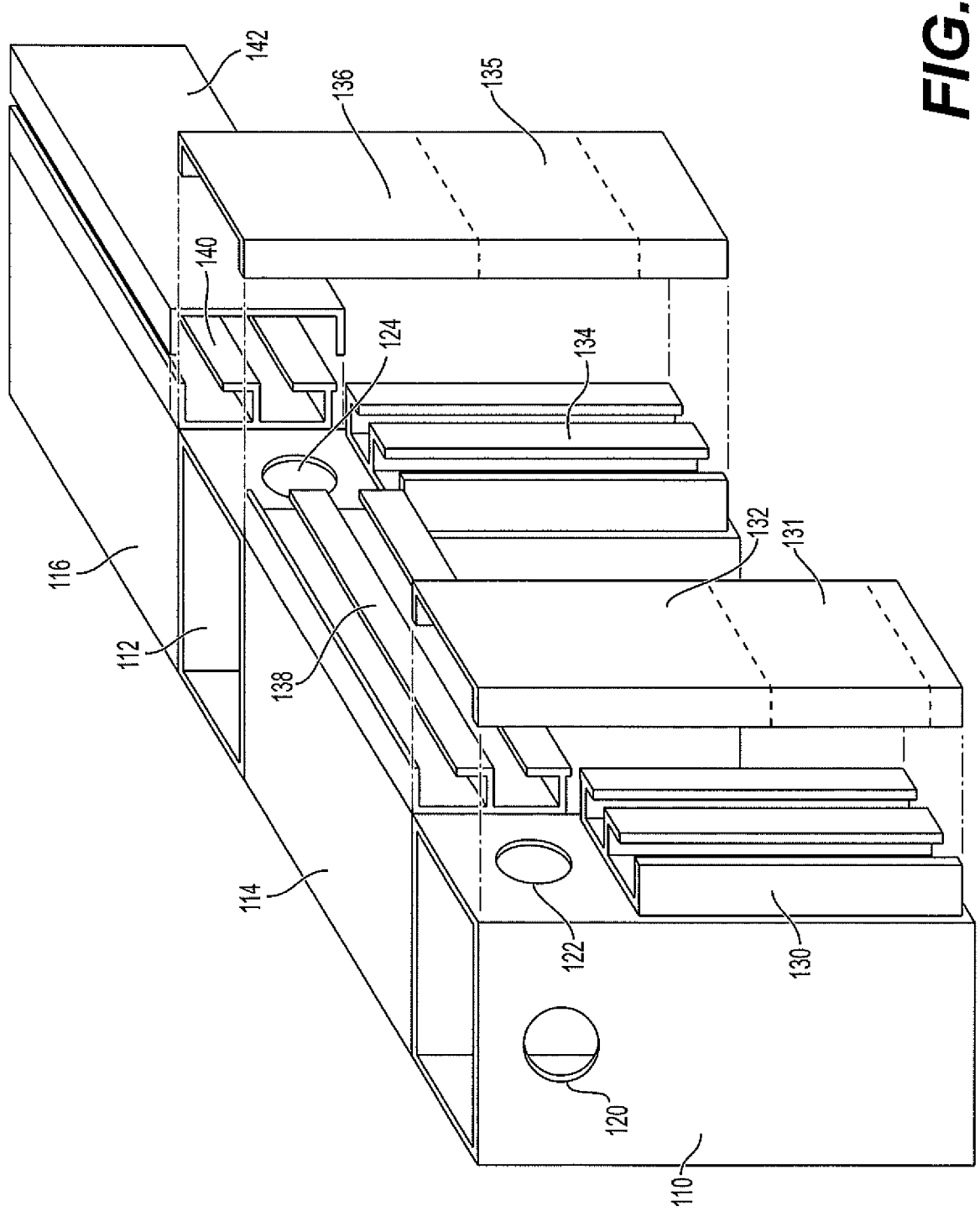
FIG. 7 is a perspective exploded view of a cable molding assembly mounted onto a door frame.

FIGS. 6A and B and 7 illustrate how this cable molding described herein may be mounted on a door frame. Specifically, in FIG. 6A, a doorway 100 has the cable molding 102 mounted around the door frame and on the front face of the door frame such that the appearance is a simply a door frame surface. Instead, the cable molding enables and facilitates the securing of electric cables inside the molding on the face of the door frame. In FIG. 6B, there is a similar doorway 104 with a continuous cover 106 mounted around the frame. The difference between 6A and 6B is that the base portion of FIG. 6A (not shown) is generally continuous around the frame but the base portions 108 shown in FIG. 6B is shown broken lines behind the cover 106. They are actually short segments or, in one example, 3 inch base blocks around the distance of the door frame 104. The base portions behind a cover may be different lengths as noted earlier, and a combination of different base portion lengths may be used in different situations. FIG. 7 is a relatively technical drawing that shows two vertical door mullions 110 and 112 that are hollow aluminum tubes. Horizontal frame members 114 and 116 are examples of door headers or similar horizontal structure. Electric cabling (not shown) is fed into and out of the access openings 120, 122, and 124 as described earlier herein. The cable molding base portions 130 and 134 are shown on the faces of the vertical mullions 110 and 112. Snap cover portions 132 and 136 are shown in exploded view where they will snap over and cover the base portions 130 and 134 respectively. Similarly, cable molding bases 138 and 140 are shown attached to the front faces of horizontal frame members 114 and 116. Cover portion 142 is shown in exploded view as it would be attached over and cover the base portion 140.

Though not shown on FIG. 7, cover portion 142 is typical of the cover portion that will be provided by the installers to cover horizontal base 138. Cover portions 132 and 136 are typical of the cover portions that will be provided by the installer to cover vertical bases 130 and 134.

Figure 10:
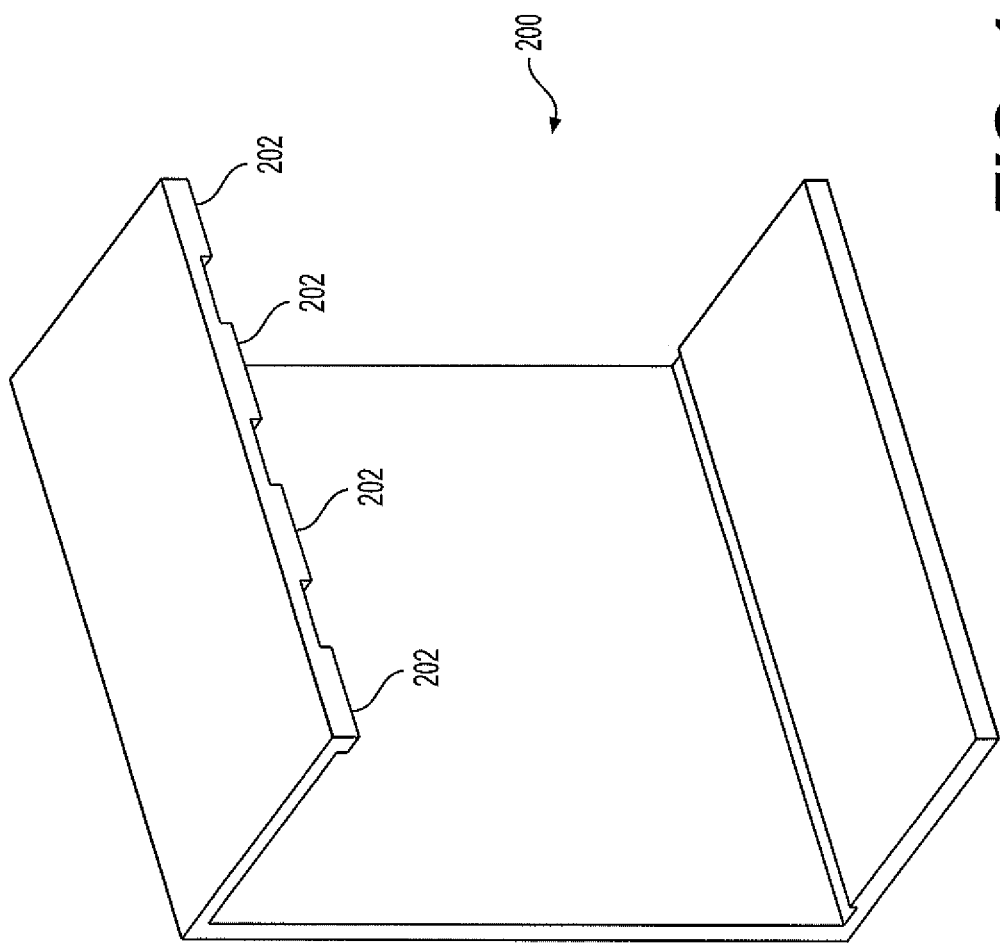
FIG. 10 is a perspective view of a cover portion with an alternative example of a lip structure.

FIG. 9 illustrates a base portion 190 similar to those described and illustrated herein except for the protuberance 192 being formed of short longitudinal segments as shown versus the alternative example of a continuous longitudinal protuberance 80 seen in, for instance, FIG. 1. Likewise, in cover 200 shown in FIG. 10, the lip 202 is shown in short longitudinal segments as compared with a continuous longitudinal lip 50 seen in earlier drawings.

Using the techniques and assembly described herein, access to electric cabling is simplified and the installation of electric doors and panic bars is made less complicated when compared with conventionally available products. This cable molding system requires much less coordination between the various building trades associate with low voltage wiring systems.

Other embodiments of the present invention will be apparent to those skilled in the art from consideration of the specification. It is intended that the specification and figures be considered as exemplary only, with a true scope and spirit of the invention being indicated by the claims.

That which is claimed is:

1. A cable molding assembly comprising:
   a base portion adapted to be fixed to a surface, and a cover portion adapted to be secured to the base portion to secure and conceal cabling that may be mounted therein, and wherein the base portion and cover portion are formed of aluminum;
   the base portion comprising a flat first center portion between a first top arm and a first bottom arm extending outwardly from the top and bottom of the center portion respectively;
   wherein first top arm has an upper surface and a lower surface and a proximal end connected to the first center portion and a distal end on the opposite end of the first top arm, and the upper surface of the top arm further defines an indent that extends along the longitudinal length of the upper surface at the proximal end of the upper surface of the first top arm of the base portion, and the upper surface of the first top arm slopes downwardly from the indent at the proximal end to the distal end;
   wherein the first bottom arm has an L-shape cross-section with a first leg that extends outwardly from the base portion in the same direction as the first top arm and a second leg that extends upwardly and that defines a channel between the bottom first and second legs and the base portion, and wherein the first bottom arm first leg has a distal end and a proximal end, the proximal end connected to the base portion, the distal end has a first protuberance that extends downwardly from the distal end and along the longitudinal length of the first bottom arm;
   the cover portion having a C-shape cross section comprising a second center portion and a second top arm and a second bottom arm with the second top arm and second bottom arm extending in the same direction substantially perpendicular from the second center portion; wherein the second top arm defines a lip protuberance downwardly from the second top arm in the direction of the second bottom arm and extending longitudinally along the length of the cable molding; and wherein the second bottom arm has a longitudinal notch that extends along the longitudinal length of the cable molding on an inside top surface of the second bottom arm, and the notch is formed at a proximal end of the top of the second bottom arm of the cover portion;
   wherein the cover portion is sized and adapted to be positioned over the base portion so that the first protuberance on the base bottom arm is received in the notch of the second bottom arm of the cover, and the lip protuberance on the cover second top arm is received in the first indent on the upper surface of the base portion top arm.

2. A cable molding assembly as described in claim 1, wherein the base portion comprises a second L-shape arm that extends outwardly and upwardly from the base portion in the same direction as the first top and first bottom arms of the base portion to thereby form a second channel in the molding.

3. A cable molding assembly as described in claim 1, wherein the cover portion further comprises an additional arm extending outwardly therefrom in the same direction as the second top arm and second bottom arm to thereby form an additional channel in the cable molding.

4. A cable molding assembly as described in claim 1, wherein the protuberance extends along the entire longitudinal length of the cable molding cover and base portion.

5. A cable molding assembly as described in claim 1, wherein the lip extends along the entire longitudinal length of the cable molding cover and base portion.

6. A cable molding assembly as described in claim 1, wherein the base portion comprises a plurality of base blocks.

7. A cable molding assembly as described in claim 6, wherein the length of the base blocks as 3".

* * * * *